United States Patent
Jimenez Felstrom et al.

(10) Patent No.: US 6,983,245 B1
(45) Date of Patent: Jan. 3, 2006

(54) WEIGHTED SPECTRAL DISTANCE CALCULATOR

(75) Inventors: Alberto Jimenez Felstrom, Löberöd (SE); Jim Rasmusson, Vellinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 555 days.

(21) Appl. No.: 09/588,629

(22) Filed: Jun. 7, 2000

(30) Foreign Application Priority Data

Jun. 7, 1999 (SE) .............................. 9902103

(51) Int. Cl.
*G10L 15/08* (2006.01)

(52) U.S. Cl. ................ 704/238; 704/226; 704/246; 704/233

(58) Field of Classification Search ............... 704/226, 704/233, 238, 246
See application file for complete search history.

(56) References Cited

U.S. PATENT DOCUMENTS

| | | | | |
|---|---|---|---|---|
| 4,897,878 A | * | 1/1990 | Boll | 704/233 |
| 4,918,732 A | | 4/1990 | Gerson et al. | |
| 5,012,519 A | * | 4/1991 | Adlersberg et al. | 704/226 |
| 5,142,585 A | * | 8/1992 | Taylor | 704/233 |
| 5,319,713 A | | 6/1994 | Waller et al. | |
| 5,703,931 A | * | 12/1997 | Martensson | 340/665 |
| 5,732,394 A | * | 3/1998 | Nakadai | 704/255 |
| 5,742,927 A | * | 4/1998 | Crozier | 704/226 |
| 5,970,446 A | * | 10/1999 | Goldberg | 704/233 |
| 6,032,116 A | * | 2/2000 | Asghar | 704/238 |

FOREIGN PATENT DOCUMENTS

| | | | |
|---|---|---|---|
| EP | 0240329 A2 | * | 7/1987 |
| EP | 0 240 329 A2 | | 10/1987 |
| EP | 0 630 168 A | | 12/1994 |
| EP | 0 959 401 A2 | | 11/1999 |
| EP | 0 996 111 A2 | | 4/2000 |
| GB | 1 514 162 A | | 6/1978 |
| GB | 2137791 A | * | 10/1984 |
| GB | 2 137 791 A | | 10/1984 |
| GB | 2 269 969 A | | 2/1994 |
| WO | 91/11696 | | 8/1991 |
| WO | 9901972 | * | 1/1999 |
| WO | 99/01972 | | 1/1999 |

\* cited by examiner

*Primary Examiner*—Vijay Chawan
(74) *Attorney, Agent, or Firm*—Nixon & Vanderhye P.C.

(57) ABSTRACT

A spectral distance calculator includes a calculator for performing spectral distance calculations to compare a spectrum of an an input signal in the presence of a noise signal and a reference spectrum. A memory pre-stores a noise spectrum from the noise signal. A masking unit masks the spectral distance between the input spectrum and the reference spectrum with respect to the pre-stored noise spectrum.

28 Claims, 2 Drawing Sheets

WEIGHTED SPECTRAL DISTANCE CALCULATOR

FIELD OF THE INVENTION

The present invention relates to a spectral distance calculator, and more particularly to a spectral distance calculator, comprising means for performing spectral distance calculations for comparison of an input spectrum, in the presence of noise, and a reference spectrum.

BACKGROUND

Speech recognition systems can be used to enter data and information in order to control different kinds of electronic devices. Despite some limitations, speech recognition has a number of applications, for example mobile phones can be provided with automatic speech recognition functionalities, in automatic voice answering (AVA) functions.

An example of an AVA function is the possibility to accept or reject an incoming call to a mobile phone by using the voice instead of a manual activation through for example a key stroke on the key pad of the phone. Such a function is applicable for a user of a mobile phone when he is for example driving a vehicle. When the user of the phone drives his vehicle and the mobile phone indicates an incoming call by a ring signal the user can give speech commands to control the phone.

A problem associated with AVA functions is that the ring signal emitted by the phone interferes strongly with the given AVA command.

Some prior art phones are provided with a simple kind of AVA functionality based on energy detectors. The phone is responsive and detects an AVA command when the speech has a higher energy level than a pre-defined threshold. As a result, only one answering function can be provided, usually "reject the call" is chosen.

A state of the art mobile phone provided by the applicant, Ericsson T18, is provided with an automatic voice dialling function.

AVA functions based on energy detectors are restrained to accept only one command as mentioned above. It is not convenient to provide several commands when the AVA functions are based on energy detectors, because it is very likely that the AVA functions of the phone will responds to sounds like the ring signal surrounding the phone.

On the other hand, AVA functions based on speech recognition are sensitive to interference from other sounds having similar spectral characteristics as speech. One reason for this is that the dissimilarity measure used in the speech recognizer is mostly based on the difference between short time spectral characteristics of the perceived sound or speech and of the pre-trained speech references or templates.

Another solution is based on low-pass filtering of the microphone signals which increases the recognition rate of the AVA commands. However, a disadvantage of this solution is that all speech information having frequencies above the filter cut-off frequency cannot be used by a speech recognizer even though the ring signal does not cover all frequencise above the cut-off.

In still another approach to solve this problem, the mobile phone can be provided with an adaptive filter between the microphone and the speech recognizer in order to filter out different ring signals.

The adaptive filter can be interpreted as an adaptive notch filter, where the location of the notches is updated continuously in a way that only disturbed frequencies are attenuated. As a result, higher recognition rates are achieved by using this method. However, such an adaptive algorithm requires many calculations. Further, they do not adapt instantaneously, and a trade off between stability and convergence time for the adaptation must be performed.

GB-A-2 137 791 discloses a spectral distance processor for comparing spectra taken from speech in the presence of background noise which has to be estimated. In order to prepare an input spectrum and a template spectrum for comparison, the processor includes means for masking the input spectrum with respect to an input noise spectrum estimate, means for masking the template spectrum with spectrum to a template noise spectrum estimate, and means for marking samples of each masked spectrum dependant upon whether the sample is due to noise or speech.

During the masking operations noise marks are associated with the masked input spectrum and template spectrum, respectively, whether the value arose from noise-or speech and taken into account during spectral distance calculations on the spectra.

Where the greater of the masked spectral samples is marked to be due to noise, a default noise distance is assigned in place of the distance between the two masked spectra.

Hence, since the spectral distance processor according to GB-A-2 137 791 is intended to operate in fluctutating or high noise level conditions which is the reason for the complex design.

However, speech recognition in a mobile phone where the user can give speech commands to control the phone as described above, a complex spectral distance processor as disclosed by GB-A-2 137 791 is not necessary, because the present noise does not fluctuate and does not have such high levels.

SUMMARY

Therefore, it is an object of the present invention to provide an improved spectral distance calculator usable in any speech recognition using spectral difference as a dissimilarity measure, which is particularly suitable in low noise level conditions.

In accordance with one aspect of the present invention, the spectral distance calculator comprises spectral distance calculation means for performing spectral distance calculations for comparison of an input spectrum, from an input signal in the presence of a noise signal, and a reference spectrum, memory means for pre-storing a noise spectrum from the noise signal, and means for masking the spectral distance between the input spectrum and the reference spectrum with respect to the pre-stored noise spectrum.

In accordance with another aspect of the present invention, the noise has a lower level than the input spectrum.

Another object of the invention is to provide a speech recognition system for comparison of an input spectrum and a reference spectrum including a spectral distance calculator as mentioned above, wherein the recognition system comprises selecting means for selecting a reference spectrum minimizing a complete spectral distance between the input spectra and the reference spectra.

Still another object of the invention is to provide a mobile phone including the speech recognition system as described.

An advantage of the present invention is that automatic voice answering functions (AVA) of a mobile phone having a speech recognition system, provided with a spectral distance calculator according to the invention, is reliable in responding to different AVA commands in presence of ring signals surrounding the phone.

BRIEF DESCRIPTION OF THE DRAWINGS

In order to explain the invention in more detail and the advantages and features of the invention a preferred embodiment will be described in detail-below, reference being made to the accompanying drawings, in which.

DETAILED DESCRIPTION

Figure 1:
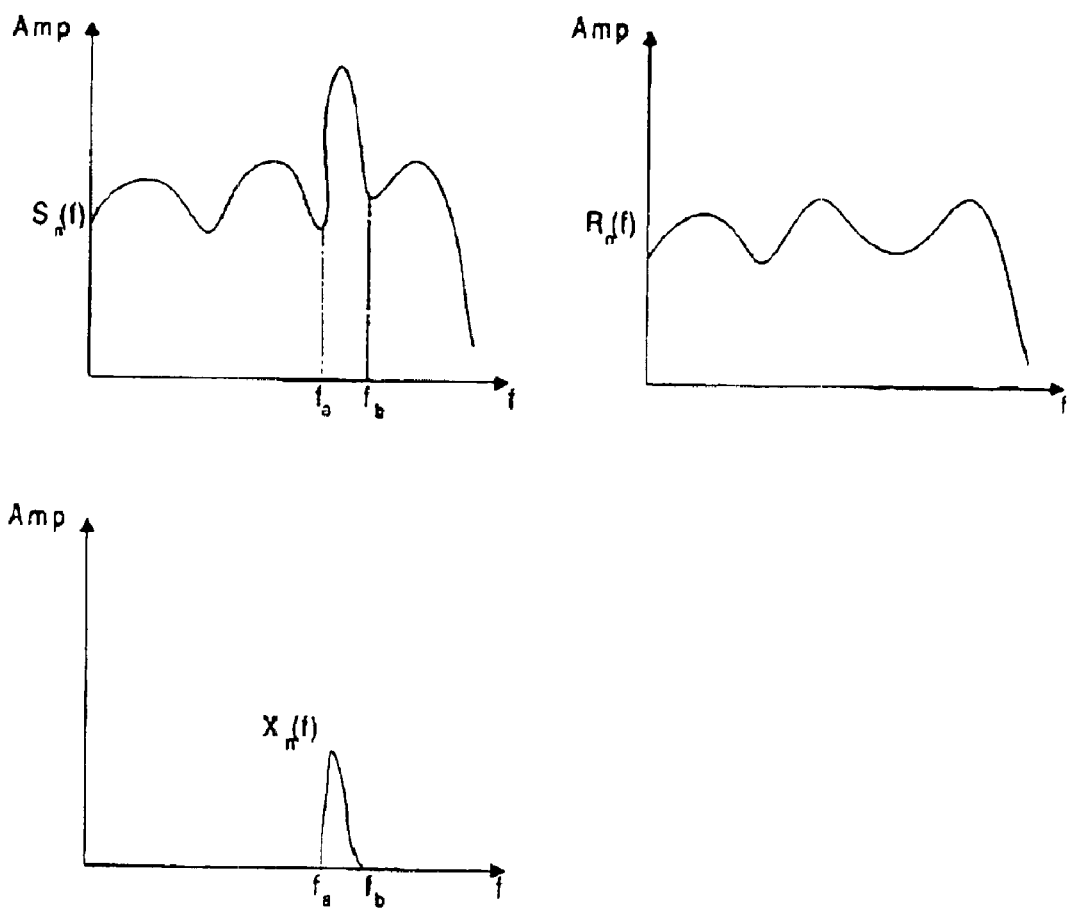
FIG. 1 shows an example of an input spectra due to a known noise, a reference spectra, and the known noise spectra.

One example embodiment of a spectral distance calculator comprises spectral distance calculation means for performing spectral distance calculations in order to compare an input spectrum due to noise and a reference spectrum. In order to deal with the interfering noise, the distance calculator further comprises masking means in order to mask the spectral distance between the input spectrum and the reference spectrum with respect to a known or pre-defined noise, stored in a memory means.

The distance calculator in the embodiment is based on city distances and discrete spectral representation of a speech. However, this solution can be generalized to other spectral representation of the speech within the scope of the invention.

Further, a spectral distance calculator according to the invention can be used in any speech recognition system, using spectral difference as dissimilarity or distance measure, for example in a mobile phone controlled by speech commands.

A user of a speech recognition system speaks into a microphone, wherein each sound is broken down into its various frequencies. The received sounds in each frequency are digitized so they can be manipulated by the speech recognition system. The microphone signal is denoted by s(n) and its corresponding spectral representation is denoted by $S_n(f)$, where n is the time for each sample and f is the current frequency.

The digitized version of the sound is matched against a set of templates or reference signals pre-stored in a system memory. A template or reference signal is denoted by r(n) and a corresponding spectral representation of the template signal is denoted by $R_n(f)$. The known noise signal in the input is denoted by x(n) and the corresponding spectral representation is denoted by $X_n(f)$.

The measure of the dissimilarity or distance used in a speech recognizer is for example given by the expression:

$$D_n = \sum_i |R_n(f_i) - S_n(f_i)|$$

Thus, the input signal spectrum $S_n(f)$ is matched against similarly formed reference signals $R_n(f)$ among the stored reference signals in the electronic storage. This matching procedure is performed by selecting the reference signal which minimizes the complete spectral distance, i.e minimizes the following expression:

$$\sum_n D_n$$

However, this selection procedure does not take into consideration any information about interfering noise signals.

In a mobile phone providing speech recognition functions or in particular so called automatic voice answering (AVA) functions the ring signal emitted by the phone interferes strongly with the given AVA command.

The ring signal is a known "noise" signal and, consequently, the spectrum representing the ring signal can be pre-stored in the memory means associated with the spectral distance calculator.

The ring signal is for example a buzzer or a personal ring signal, such as a simple melody, selected or programmed by the user. However, when the ring signal is selected or programmed it is "known" by the phone and a spectrum representing the current ring signal can be stored in the memory means for pre-stored noise spectra. In an alternative embodiment a plurality of spectra from different ring signals can be pre-stored and the current ring signal selected is marked by a bit set in the memory. Then, the spectral distance calculator can identify and select the current spectrum to be used in the masking procedure according to the invention.

According to FIG. 1, the input signal for a comparison is exposed to a known noise in the spectrum between the two frequencies $f_a$ and $f_b$. The corresponding reference signal $R_n(f)$ for comparison with the input signal is not considered to be due to any noise. Hence, in order to get a thorough comparison between the input signal and the reference signal or their spectra, the input signal has to be masked in any way to compensate for the known noise. According to the invention, the spectral distance calculation or measure of the dissimilarity is modified by a weight $A_i$ according to the following expression:

$$D_n = \sum_i A_i |R_n(f_i) - S_n(f_i)|.$$

In this expression $A_i$ is equal to zero if the frequency $f_i$ of the input signal is due to any known noise and $A_i$ is unity if no noise is present at the current frequency $f_i$.

Figure 2:
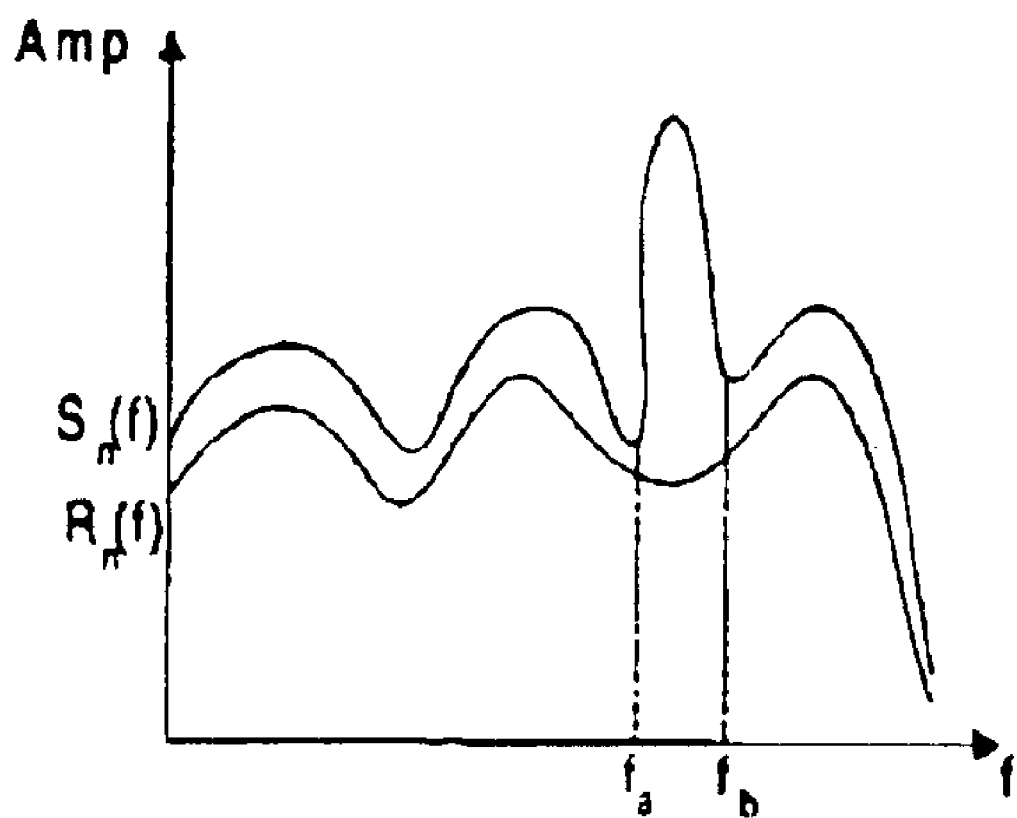
FIG. 2 illustrates the noise compensation according to the invention.

FIG. 2 illustrates the noise compensation according to the invention, wherein the spectral distance between the input spectrum $S_n(f_i)$ and the reference spectrum $R_n(f_i)$ is assigned a zero value in the spectrum between the two frequencies $f_n$ and $f_h$.

In one example embodiment of the spectral distance calculator, it is included in a speech recognition system for comparison of an input spectrum and a reference spectrum. A reference spectrum is selected that minimizes a complete spectral distance between the input spectra and the reference spectra.

Further, the speech recognition system is included in a mobile phone providing AVA functions, such as "accept the call" if a user of the phone would like to answer the call, "reject the call" if he doesn't want to answer the call, or "forward" if the incoming call should be connected to a voice mail or another phone number.

Although the invention has been described by way of a specific example embodiment, the present invention provides a weighted spectral distance calculator that fully satisfies the aims and advantages set forth above. Alternatives, modifications, and variations are apparent to those skilled in the art.

For example, in another embodiment, the calculator is provided with an adaptive notch filter which not only filters the input signal but also the reference signal. The calculation will be more accurate if a filtered input signal is compared to a filtered reference signal. Further, this solution does not require any adaptive algorithms. Since there is no additional computational loading, this embodiment works instantaneously without stability problems. However, the automatic voice answering means requires continuously knowledge of the disturbed frequencies.

In an alternative further example embodiments, more sophisticated weights using real valued $A_i$ allow different levels of suppression depending on how much the specific frequencies fi are disturbed.

What is claimed is:

1. A speech recognition system, comprising:
   a spectral distance calculator including;
      a calculator for performing a spectral distance calculation comparing an input spectrum of an input signal in the presence of a first known noise signal used to perform a function unrelated to speech recognition and a reference spectrum;
      a memory for pre-storing one or more noise spectrums of one or more known noise signals including the first known noise signal; and
      masking circuitry for masking the spectral distance between the input spectrum and the reference spectrum using the pre-stored noise spectrum of the first known noise signal, and
   a selector for selecting a reference spectrum minimizing a spectral distance between the input spectrum and the reference spectrum.

2. A speech recognition system according to claim 1, wherein the calculator is configured to assign the spectral distance between the input spectrum and the reference spectrum a zero value for each frequency of the input spectra which is due to noise.

3. A speech recognition system according to claim 1, wherein the noise has a lower level than a level of the input spectrum.

4. A speech recognition system according to claim 1, wherein the spectral distance calculation includes calculating the following expression for spectral distance $D_n$:

$$D_n = \sum_i A_i |R_n(f_i) - S_n(f_i)|.$$

where $R_n(f_i)$ is the reference spectrum, $S_n(f_i)$ is the input signal spectrum, and $A_i$ is equal to zero if a frequency $f_i$ of the input signal is due to a known noise and $A_i$ is unity if no noise is present at the frequency $f_i$.

5. A speech recognition system according to claim 1, wherein the spectral distance is the sum of the spectral distance calculations for a number of samples discerning the reference spectra from each other.

6. A mobile telephone including the speech recognition system according to claim 1, comprising:
   call answering circuitry operatively connected to the speech recognition system and responsive to one or more speech answering commands each forming an input spectrum.

7. A mobile telephone according to claim 6, wherein the call answering circuitry is responsive to an accept call command for accepting a call.

8. A mobile telephone according to claim 6, wherein the call answering circuitry is responsive to a reject call command for rejecting a call.

9. A mobile telephone according to claim 6, wherein the call answering circuitry is responsive to a forward call command for forwarding a call.

10. The speech recognition system in claim 1, wherein the first known noise signal is a periodic signal with a repeating pattern used to indicate a message.

11. The speech recognition system in claim 1, wherein the first known noise signal is a ring signal used to indicate a message.

12. The speech recognition system in claim 1, wherein the first known noise signal is a melody or a buzzer signal used to indicate a message.

13. The speech recognition system in claim 1, wherein the first known noise signal is a signal output from a speaker.

14. The speech recognition system in claim 1, wherein the function unrelated to speech recognition is to drive a speaker.

15. A speech recognition method, comprising:
   comparing an input spectrum of an input signal in the presence of a first known noise signal used to perform a function unrelated to speech recognition and a reference spectrum to obtain a spectral distance;
   pre-storing one or more noise spectrums of one or more known noise signals including the first known noise signal;
   masking the spectral distance between the input spectrum and the reference spectrum using the pre-stored noise spectrum of the first known noise signal; and
   selecting a reference spectrum minimizing a spectral distance between the input spectrum and the reference spectrum.

16. A speech recognition method according to claim 15, further comprising:
   assigning the spectral distance between the input spectrum and the reference spectrum a zero value for each frequency of the input spectra which is due to noise.

17. A speech recognition method according to claim 15, wherein the noise has a lower level than a level of the input spectrum.

18. A speech recognition method according to claim 15, further comprising:
   calculating the following expression for spectral distance $D_n$:

$$D_n = \sum_i A_i |R_n(f_i) - S_n(f_i)|,$$

where $R_n(f_i)$ is the reference spectrum, $S_n(f_i)$ is the input signal spectrum, and $A_i$ is equal to zero if a frequency $f_i$ of the input signal is due to a known noise and $A_i$ is unity if no noise is present at the frequency $f_i$.

19. A speech method according to claim 15, wherein the spectral distance is the sum of the spectral distance calculations for a number of samples discerning the reference spectra from each other.

20. The speech recognition method according to claim 15 associated with a telephone, further comprising:
   detecting and recognizing one or more speech answering commands, each forming an input spectrum.

21. The speech recognition method according to claim 20, further comprising:
   responding to an accept call command to accept a call to the telephone.

22. The speech recognition method according to claim 20, further comprising:
   responding to a reject call command to reject a call to the telephone.

23. The speech recognition method according to claim 20, further comprising:
   responding to a forward call command is forward a call to the telephone.

24. The speech recognition method according to claim 15, wherein the first known noise signal is a periodic signal with a repeating pattern.

25. The speech recognition method according to claim 15, wherein the first known noise signal is a ring signal used to indicate a message.

26. The speech recognition method according to claim 15, wherein the first known noise signal is a melody or a buzzer signal.

27. The speech recognition method according to claim 15, wherein the first known noise signal is a signal output from a speaker.

28. The speech recognition method according to claim 15, wherein the function unrelated to speech recognition is to drive a speaker.

* * * * *

UNITED STATES PATENT AND TRADEMARK OFFICE
CERTIFICATE OF CORRECTION

PATENT NO. : 6,983,245 B1  
DATED : January 3, 2006  
INVENTOR(S) : Felstrom et al.

Page 1 of 1

It is certified that error appears in the above-identified patent and that said Letters Patent is hereby corrected as shown below:

<u>Title page,</u>  
Item [57], ABSTRACT,  
Line 3, delete the duplicate word "an.".

<u>Column 1,</u>  
Line 46, "responds" should read -- respond. --.  
Line 61, "frequencise" should read -- frequencies. --.

<u>Column 2,</u>  
Line 19, delete the dash in "noise-or.".  
Line 26, delete "since.".

<u>Column 3,</u>  
Line 4, delete the dash in "detail-below.".

<u>Column 4,</u>  
Lines 42 and 43, "$f_n$ and $f_h$" should read -- $f_a$ and $f_b$. --.

<u>Column 5,</u>  
Line 3, "continuously" should read -- continuous. --.  
Lines 38-39, there should be a comma at the end of the equation instead of a period.

<u>Column 6,</u>  
Line 66, "is" should read -- to. --.

Signed and Sealed this

Twenty-third Day of May, 2006

JON W. DUDAS  
*Director of the United States Patent and Trademark Office*